United States Patent
Streit

(10) Patent No.: US 11,679,820 B2
(45) Date of Patent: Jun. 20, 2023

(54) SPRING-DAMPER SYSTEM

(71) Applicant: HYDAC MOBILHYDRAULIK GMBH, Sulzbach/Saar (DE)

(72) Inventor: Alexander Streit, Merzig (DE)

(73) Assignee: HYDAC MOBILHYDRAULIK GMBH, Sulzbach/Saar (DE)

( * ) Notice: Subject to any disclaimer, the term of this patent is extended or adjusted under 35 U.S.C. 154(b) by 99 days.

(21) Appl. No.: 17/437,544

(22) PCT Filed: Feb. 26, 2020

(86) PCT No.: PCT/EP2020/054997
§ 371 (c)(1),
(2) Date: Sep. 9, 2021

(87) PCT Pub. No.: WO2020/187539
PCT Pub. Date: Sep. 24, 2020

(65) Prior Publication Data
US 2022/0161872 A1 May 26, 2022

(30) Foreign Application Priority Data
Mar. 15, 2019 (DE) ...................... 10 2019 001 855.9

(51) Int. Cl.
*B62D 33/06* (2006.01)
*B60G 11/26* (2006.01)
(Continued)

(52) U.S. Cl.
CPC ........ *B62D 33/0608* (2013.01); *B60G 11/265* (2013.01); *B60G 17/04* (2013.01);
(Continued)

(58) Field of Classification Search
CPC ............ B60G 99/002; B60G 2202/154; B60G 2202/413; B60G 2202/416;
(Continued)

(56) References Cited

U.S. PATENT DOCUMENTS 5,177,681 A * 1/1993 Sato .................... B60G 17/0162
701/38
5,540,298 A * 7/1996 Yoshioka ................. B62D 6/00
303/193

(Continued)

FOREIGN PATENT DOCUMENTS

DE 10 2017 212 155 1/2018
DE 10 2016 225 626 6/2018
(Continued)

OTHER PUBLICATIONS

International Search Report (ISR) dated May 29, 2020 in International (PCT) Application No. PCT/EP2020/054997.

*Primary Examiner* — Toan C To
(74) *Attorney, Agent, or Firm* — Wenderoth, Lind & Ponack, L.L.P.

(57) ABSTRACT

A spring-damper system includes at least a differential cylinder (4), a hydraulic accumulator (26) and a control valve device (1, 2). By at least one motor-pump unit (22), pressure fluid can be supplied to the annular end (6) or both the annular end (6) and the piston end (8) of the differential cylinder (4) in a closed circuit using the control valve device (1, 2).

12 Claims, 2 Drawing Sheets

(51) Int. Cl.
*B60G 17/04* (2006.01)
*B60G 17/08* (2006.01)
*B60G 99/00* (2010.01)

(52) U.S. Cl.
CPC ........... *B60G 17/08* (2013.01); *B60G 99/002* (2013.01); *B60G 2202/154* (2013.01); *B60G 2202/413* (2013.01); *B60G 2202/416* (2013.01); *B60G 2202/44* (2013.01); *B60G 2204/162* (2013.01); *B60G 2300/08* (2013.01); *B60G 2300/09* (2013.01); *B60G 2500/10* (2013.01); *B60G 2500/30* (2013.01); *B60G 2600/182* (2013.01); *B60G 2800/9123* (2013.01)

(58) Field of Classification Search
CPC .......... B60G 2202/44; B60G 2204/162; B60G 2300/08; B60G 2300/09; B60G 2500/10; B60G 2500/30; B60G 2600/182; B60G 2800/9123
See application file for complete search history.

(56) References Cited

U.S. PATENT DOCUMENTS

| | | | | |
|---|---|---|---|---|
| 5,682,980 A * | 11/1997 | Reybrouck | ............ | B60G 17/08 280/124.16 |
| 6,416,061 B1 * | 7/2002 | French | ............ | F16F 9/36 280/124.159 |
| 6,575,484 B2 * | 6/2003 | Rogala | ............ | B60G 17/033 280/124.16 |
| 7,051,526 B2 * | 5/2006 | Geiger | ............ | F16D 48/02 60/475 |
| 7,497,452 B2 * | 3/2009 | Schedgick | ............ | B60G 17/0416 280/124.159 |
| 8,672,337 B2 * | 3/2014 | van Der Knaap | ............ | B60G 17/0152 280/124.16 |
| 8,966,889 B2 * | 3/2015 | Six | ............ | F15B 1/04 60/413 |
| 9,481,221 B2 * | 11/2016 | Reybrouck | ............ | F16F 9/46 |
| 10,358,010 B2 * | 7/2019 | Boon | ............ | B60G 21/06 |
| 10,421,330 B2 | 9/2019 | Jeong | | |
| 10,434,835 B2 * | 10/2019 | Six | ............ | F15B 13/027 |
| 10,557,512 B2 * | 2/2020 | Förster | ............ | F16F 9/325 |
| 10,682,894 B2 * | 6/2020 | Ito | ............ | B60G 17/048 |
| 10,717,336 B2 * | 7/2020 | Frank | ............ | F15B 21/005 |
| 11,440,366 B1 * | 9/2022 | O'Shea | ............ | B60G 17/08 |
| 2004/0113377 A1 * | 6/2004 | Klees | ............ | B60G 21/073 280/5.514 |
| 2005/0034911 A1 * | 2/2005 | Darby | ............ | B60G 17/005 180/209 |
| 2006/0090462 A1 * | 5/2006 | Yoshino | ............ | E02F 9/2207 60/468 |
| 2007/0045067 A1 * | 3/2007 | Schedgick | ............ | B60G 99/002 188/266 |
| 2007/0045069 A1 * | 3/2007 | Schedgick | ............ | B60G 99/002 188/266 |
| 2007/0170680 A1 * | 7/2007 | Knaap | ............ | B60G 17/0152 280/124.106 |
| 2007/0278752 A1 * | 12/2007 | Schedgick | ............ | B60G 17/0416 280/5.514 |
| 2008/0088107 A1 * | 4/2008 | Bitter | ............ | B60G 21/073 280/124.161 |
| 2008/0100017 A1 * | 5/2008 | Bitter | ............ | B66F 9/22 280/124.16 |
| 2009/0230637 A1 * | 9/2009 | Bauer | ............ | B60G 17/0416 267/64.25 |
| 2009/0261541 A1 * | 10/2009 | Huth | ............ | B60G 17/056 280/5.507 |
| 2011/0187065 A1 * | 8/2011 | Van Der Knaap | ..... | B60G 17/08 280/5.507 |
| 2015/0202940 A1 * | 7/2015 | Germain | ............ | B60G 17/04 280/124.161 |
| 2015/0217619 A1 * | 8/2015 | Benevelli | ............ | B60G 17/056 280/124.106 |
| 2017/0313153 A1 | 11/2017 | Masamura | | |
| 2018/0015802 A1 | 1/2018 | Jeong | | |
| 2018/0022179 A1 * | 1/2018 | Collins | ............ | B60G 17/0424 280/5.5 |
| 2018/0264908 A1 | 9/2018 | Masamura | | |
| 2019/0084366 A1 * | 3/2019 | Birch | ............ | B60G 17/0195 |
| 2020/0009936 A1 * | 1/2020 | Huth | ............ | B60G 11/30 |
| 2022/0032707 A1 * | 2/2022 | Yoshida | ............ | B60G 17/019 |

FOREIGN PATENT DOCUMENTS

| | | |
|---|---|---|
| EP | 2 952 419 | 12/2015 |
| EP | 3 216 633 | 9/2017 |
| JP | 2000-264034 | 9/2000 |
| WO | 2007/139380 | 12/2007 |
| WO | 2016/124933 | 8/2016 |

* cited by examiner

SPRING-DAMPER SYSTEM

FIELD OF THE INVENTION

The invention relates to a spring-damper system comprising at least a differential cylinder, a hydraulic accumulator and a control valve device.

BACKGROUND OF THE INVENTION

Systems of this type are state of the art, see EP 2 952 419 A2. Such systems having double-acting suspension cylinders are preferably used in the cabin suspension systems of vehicles that are suitable for operation on rough unpaved ground, as is the case for agricultural or forestry vehicles, construction machinery or other special vehicles. To protect the cabin crew against impact loads occurring during operation, cabins of such vehicles are usually supported against the chassis by double-acting suspension cylinders. In the known system mentioned above, a proportional 4/2 directional control valve is used to connect the respective suspension cylinder in the form of a differential cylinder to the hydraulic accumulator. The proportional 4/2 directional control valve forms a variable throttle point as a function of its actuation. By linking the damping valve to the vehicle control system present in the vehicles concerned, the vehicle control system contains signal-generating components, such as an acceleration sensor and an angle sensor, and the damping force can be adjusted to the respective operating conditions to achieve reduced vibration stress on the cabin.

SUMMARY OF THE INVENTION

Based on this prior art, the invention addresses the problem of providing a spring-damper system which, while retaining the advantages achieved in the prior art, is characterized by further improved operating behavior in comparison to the prior art.

According to the invention, this problem is basically solved by a spring-damper system having, as an essential feature of the invention, at least one motor-pump unit can be used to supply pressure fluid to the annular end or both the annular end and the piston end of the differential cylinder in a closed circuit using the control valve device.

While the known system, as a passive system, is adaptive in that the damping strength can be adjusted, the differential cylinder cannot generate active forces. However, the system according to the invention can be implemented as an active suspension system because of the option of an energy supply initiated by the control valve device by the motor-pump unit. The controlled supply of energy to the annular end and/or piston end of the differential cylinder can be used to influence the forces in both the compression and rebound directions, unlike in the known system. Adapting to the conditions of driving operation, optimum vibration behavior of the cabin can then be achieved in accordance with the data supplied by the vehicle sensor system.

In preferred exemplary embodiments, the control valve device has two control valves. In fluid-conveying manner, one control valve is connected at its inlet to the annular end and at its outlet is connected to both the piston end and to the inlet of the second control valve. The outlet of the second control valve is connected to the piston end and to the inlet of the pump of the motor-pump unit. In this arrangement, the control valve device forms a pressure regulator that can be used to supply the differential cylinder, whose piston end in conjunction with the accumulator bears the static load applied by the vehicle, with additional pressure at the annular end to generate the additional dynamic forces required for active suspension.

Advantageously, both control valves are proportional throttle valves, preferably electro-magnetically actuatable 2/2-way proportional throttle valves. They can be actuated directly by the vehicle electronics resulting in high switching dynamics.

Advantageously, the arrangement may further be such that the hydraulic accumulator is installed in the connection line between the outlet of the second control valve and the inlet of the pump.

Advantageously, the arrangement can further be made in such a way that a check valve, which opens in the direction of the annular end, is installed in the connection line between the outlet of the pump and a branching-off point, which is connected to the annular end and to the inlet of the first control valve in a fluid-conveying manner. In this way, the differential cylinder is protected against a pressure drop when the pump is at a standstill.

Advantageously, a pressure relief valve can be installed between the part of the connection line routed from the outlet of the pump to the check valve, with the connection line routed to the pressure accumulator. The check valve opens in the direction of the branching-off point. In this way, the maximum pressure that can be supplied by the motor-pump unit can be preset.

Not only are dynamic forces generated in the respective differential cylinder of the active suspension system according to the invention, but the static pressure in the differential cylinder also bears the static cabin load acting thereon. Thus, the pump arranged in the closed circuit is also pressurized. For a typical cabin weight in the range of, for instance, 300 kg and a piston rod diameter of about 18 mm, as is often the case with present cabin suspension cylinders, this arrangement results in a static pressure in the system of more than 100 bar. Conventional gear pumps, which are characterized by a high operational reliability and a construction that is inexpensive to manufacture, are therefore not suitable for use in this application, as they are only approved for much lower pressures at the suction end. In an advantageous embodiment, despite this difficulty, the advantages of a gear pump are made use of in the invention by using a gear pump in the motor-pump unit. The leakage oil port of the gear pump is connected to a return line. The connection via a leakage oil line to the tank relieves the pressure at the shaft seal of the gear pump so that it is pressure-resistant at both ports. Also, it can be used reliably in the system according to the invention.

Advantageously, the outlet of a feed pump is connected to the inlet of the gear pump. This connection can be used to compensate for sinking of the cabin caused by the permanent leakage of oil from the closed circuit to the tank. To be able to maintain the desired level position and/or for a desired level setting, a proportional pressure relief valve inserted between the outlet of the feed pump and the tank can be used to adjust the pressure supplied by the feed pump. An additional advantage of this arrangement is the continuous flushing of the closed circuit of the system because of the leakage and the new oil permanently injected to compensate for the leakage.

Alternatively, the motor-pump unit can have a radial piston pump or instead an orbital motor can be used, i.e. pumps whose construction permits high pressures at the suction end.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
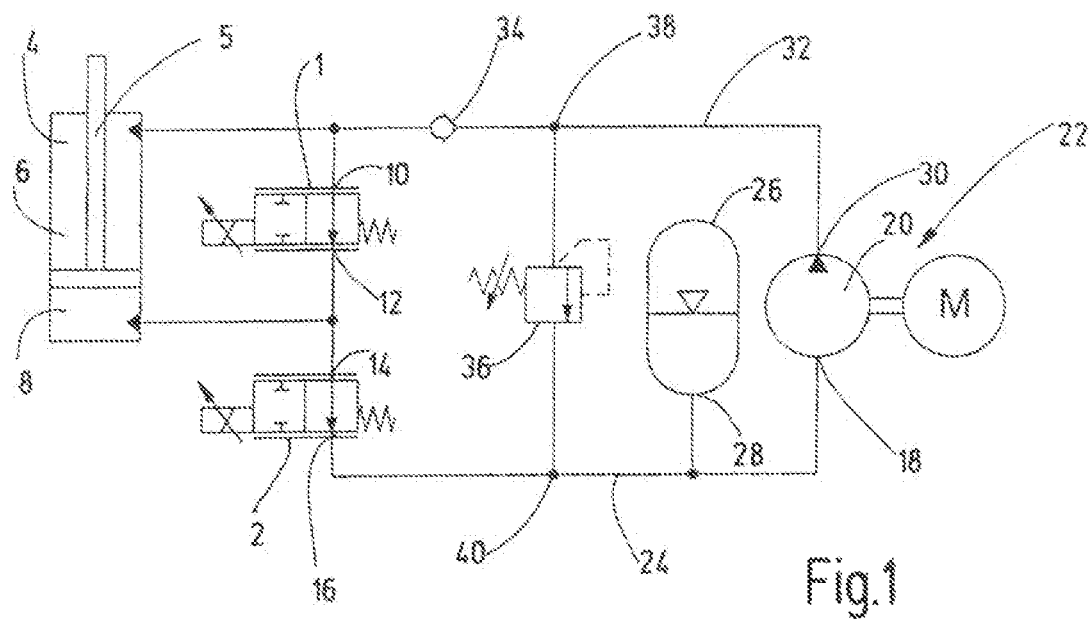
FIG. 1 is a schematic diagram of the fluid circuit of a first exemplary embodiment of a spring-damper system according to the invention.

In the figures, a differential cylinder 4, provided as a suspension strut, in particular of a cabin suspension, has a piston rod 5 and has working chambers of differently effective piston surfaces at its annular end 6 and its piston end 8. The annular end 6 and piston end 8 are connected to a control valve device comprising two control valves, each formed by a proportional throttle valve. The first and second exemplary embodiments each have first and second electromagnetically controlled 2/2-way proportional throttle valves 1 and 2, respectively. Of these, the first proportional throttle valve 1 at its inlet 10 is connected to the annular end 6 of the differential cylinder 4 and at its outlet 12 is connected to both the piston end 8 and to the inlet 14 of the second proportional throttle valve 2. The second proportional throttle valve is connected at its outlet 16 to the inlet 18 of the pump 20 of the motor-pump unit 22 via a connection line 24. The oil end 28 of a hydropneumatic pressure accumulator 26 is also connected to the connection line 24. The outlet 30 at the pressure end of the pump 18 is connected to the annular end 6 of the differential cylinder 4 via a second connection line 32, in which there is a check valve 34 that opens in the direction of the annular end 6. A pressure relief valve 36 interposed between a branch point 38 located at the second connection line 32 between the check valve 34 and the pump outlet 30, and a branch point 40 at the first connection line 24 complements the fluid circuit of the first exemplary embodiment shown in FIGS. 1 to 5.

In this arrangement, the piston end 8 of the differential cylinder 4, in conjunction with the hydraulic accumulator 26, bears the static load, which can result in a static pressure of more than 100 bar for a standard 3-point support of a cabin weighing 300 kg. In view of the high-pressure level, the pump 20 of the motor-pump unit 22 in this example is an axial piston pump, which permits high pressures at the suction-end inlet 18. Alternatively, an orbital motor could be used.

As long as the proportional throttle valves 1 and 2 are not actuated and are open in their non-throttling home position, the motor-pump unit 22 does not have to build up any pressure. Apart from the line resistances, the pump 20 pumps the oil without pressure difference in the closed circuit containing the differential cylinder 4. The annular chamber 6 is connected to the pressure-end outlet 30 of the pump 20.

The piston end 8 is connected to the outlet 12 of the first proportional throttle valve 1 and to the inlet 14 of the second proportional throttle valve 2. As long as both valves 1 and 2 are in their home position, the static pressure at the annular end 6 and at the piston end 8 is identical. Because they are interconnected without throttling, the suspension is undamped. In FIGS. 2 to 5, four main states of the system that occur when the valves 1 and 2 are actuated, are indicated in that the line sections bearing the higher pressure, are drawn using a greater line thickness.

Figure 2:
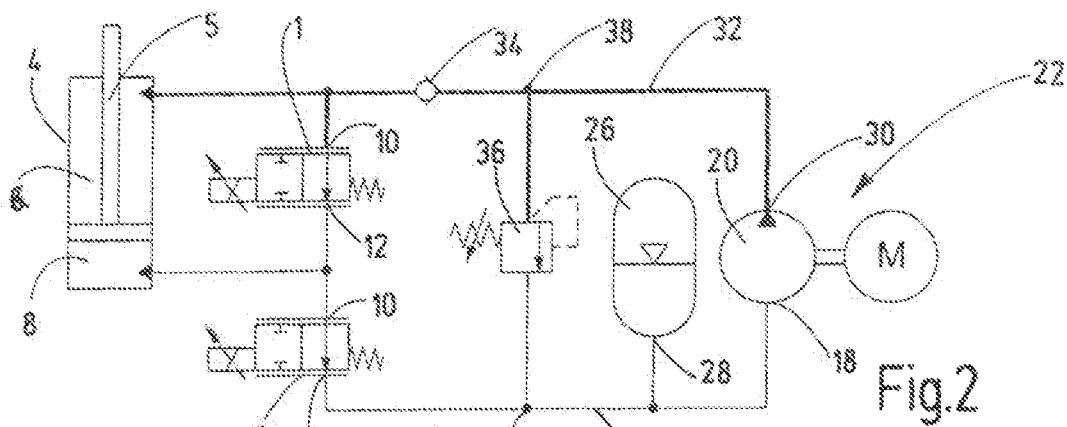
FIGS. 2 to 5 are schematic diagrams of the fluid circuit of FIG. 1, with lines of different line widths indicating four different main states of the spring-damper system of the first exemplary embodiment.

In the "active compression" state illustrated in FIG. 2, the first proportional throttle valve 1 is actuated from the open home position to move to a throttle position. The volume flow generated by the pump 20 causes a pressure acting in the annular chamber 6 of the differential cylinder 4 to be built up by the throttling effect of the actuated valve 1. The built-up pressure gives rise to an active compression motion of the piston rod 5.

Figure 3:
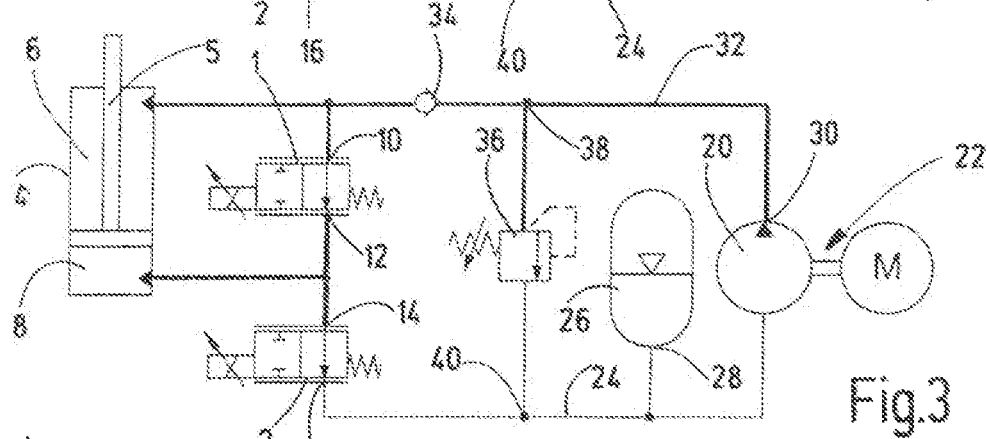

FIG. 3 refers to the "Active rebound" state. In this state, the second proportional throttle valve 2 is actuated. As a result of its throttling effect, a pressure is built up both in the annular chamber 6 and in the piston chamber 8. Because of the larger piston surface of piston chamber 8, the increased pressure in the cylinder 4 causes an active extending motion of the piston rod 5.

Figure 4:
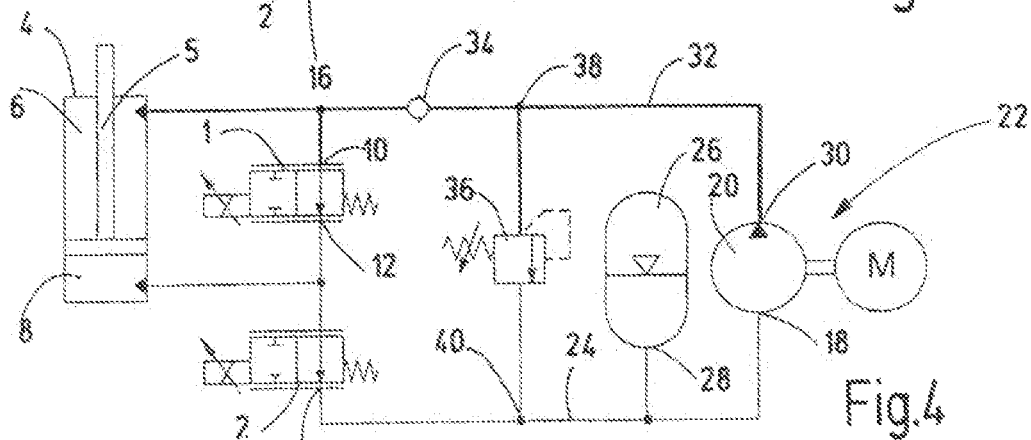

FIG. 4 refers to the "Damping during rebound" state. In this state, the piston rod 5 of the cylinder 4 performs an extending motion. Oil is then displaced from the annular chamber 6 to the piston chamber 8 via the open first proportional throttle valve 1, which is not actuated. If the first proportional throttle valve 1 is now actuated, this volume flow builds up and creates a pressure difference between the annular end 6 and the piston end 8 of the cylinder 4. This pressure difference has a damping effect during the extending motion.

Figure 5:
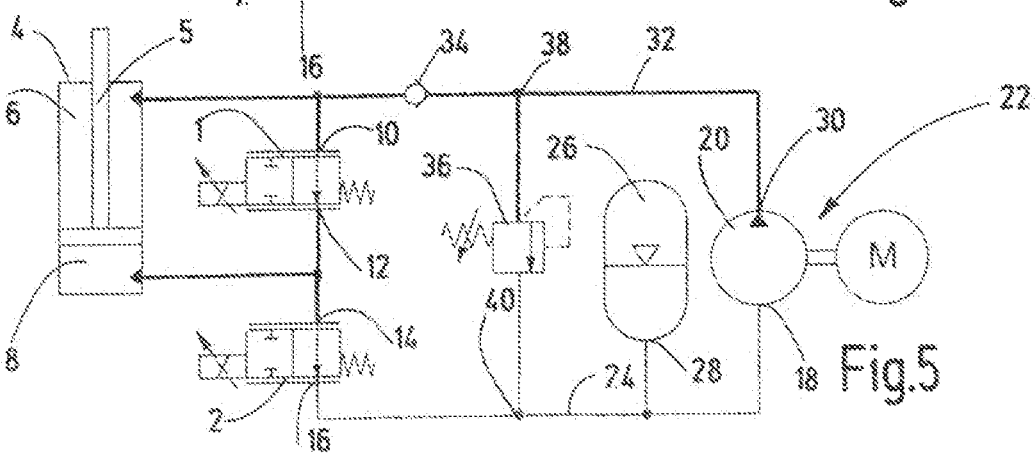

FIG. 5 refers to the "Damping during compression" state. The piston rod 5 of the cylinder 4 is now in a retracting motion. Some of the oil flows from the piston end 8 to the annular end 6 via the non-actuated, open first proportional throttle valve 1. The other part flows into the accumulator 26 via the second proportional throttle valve 2. If the second proportional throttle valve 2 is now actuated, a pressure difference is built up by the volume flow to the accumulator 26 and counteracts the spring compression in a damping manner.

Figure 6:
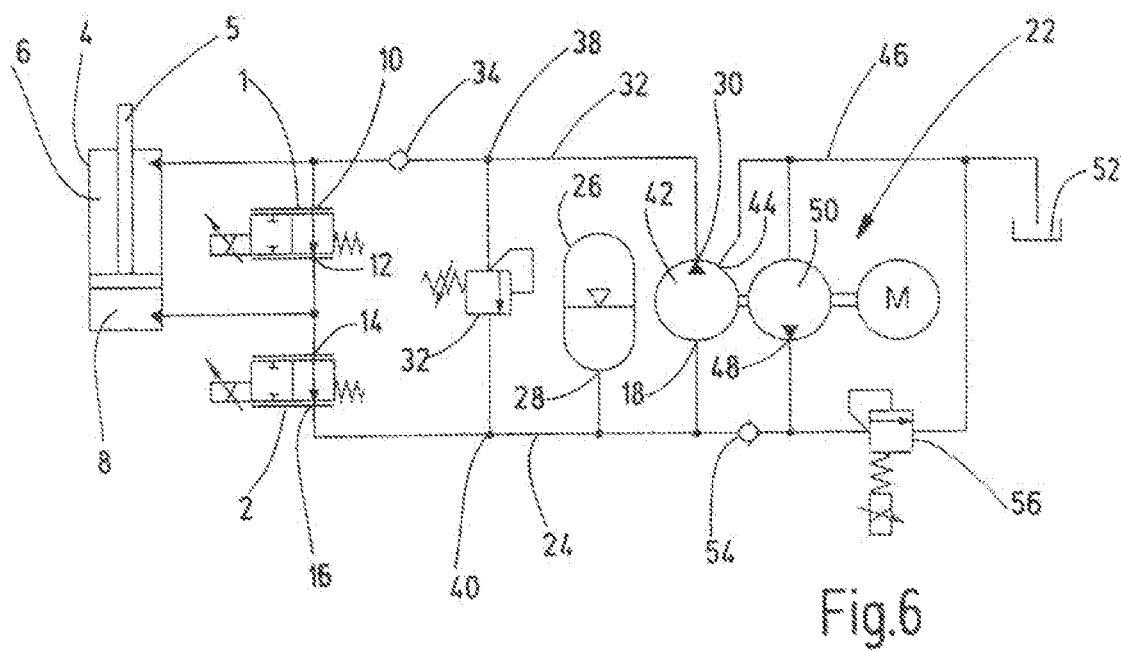
FIG. 6 is a schematic diagram of the fluid circuit of a second exemplary embodiment of the spring-damper system according to the invention.

FIG. 6 shows a second exemplary embodiment in which the closed circuit having differential cylinder 4, control valves 1 and 2, accumulator 26 and pump of motor-pump unit 22 corresponds to the first exemplary embodiment. The difference, in contrast thereto, is that instead of the axial piston pump 20, a gear pump 42 having a leakage oil port 44 is used. The leakage oil port 44 is connected to a tank 52 via a return line 46 and is thus non-pressurized. The resulting pressure release of the shaft seal of the gear pump 42 renders it pressure-resistant at its two ports, and thus, safe to operate despite the high pressure level present in the closed circuit. However, the leakage oil flow, which can be up to 1% of the nominal volume flow, causes the piston rod 5 to continuously subside because of the permanent drain from the closed circuit to the tank 52. To still be able to maintain the desired level position, a feed pump 50 in the form of a small gear pump is provided. Feed pump 50 takes in oil from the tank 52 and generates a feed pressure at its pressure-end outlet 48, which is connected to the connection line 24 via a check valve 54. A proportional pressure relief valve 56, which is installed between the outlet 48 of the feed pump 50 and the tank 52, can be used to adjust the feed pressure, and thus, the level position. An additional advantage of the second embodiment of FIG. 6 is that because of the leakage and the oil that is permanently re-injected to compensate for the leakage, the system of the second embodiment continuously flushes the closed circuit of the system.

While various embodiments have been chosen to illustrate the invention, it will be understood by those skilled in the art that various changes and modifications can be made therein without departing from the scope of the invention as defined in the claims.

The invention claimed is:

1. A spring-damper system, comprising:
   a differential cylinder having an annular end and a piston end;
   a control valve device having first and second control valves, the first and second control valves being proportional throttle valves, each of the proportional throttle valves being open in a non-throttling open position;
   a first pump operated by a motor and capable of supplying pressure fluid to the annular end or both the annular end and the piston end of the differential cylinder in a closed circuit using the control valve device, the first control valve being connected in fluid communication at an inlet of the first control valve to the annular end and at an outlet of the first control valve to the piston end and to an inlet of the second control valve, an outlet of the second control valve being connected in fluid communication to an inlet of the first pump; and
   a hydraulic accumulator connected in fluid communication to the closed circuit;
   whereby the spring-damper system controls suppling energy to the annular end and/or the piston end of the differential cylinder.

2. The spring-damper system according to claim 1 wherein
   the proportional throttle valves are electromagnetically actuatable 2/2-way proportional throttle valves.

3. The spring-damper system according to claim 1 wherein
   the hydraulic accumulator is installed in a connection line between the outlet of the second control valve and the inlet of the first pump.

4. The spring-damper system according to claim 1 wherein
   a check valve opening in the direction of the annular end is installed in a connection line between an outlet of the first pump and a branching-off point connected to the annular end and to the inlet of the first control valve in a fluid communication.

5. The spring-damper system according to claim 4 wherein
   a pressure relief valve is installed between a part of the connection line routed from the outlet of the first pump to the check valve and a connection line routed to the hydraulic accumulator.

6. The spring-damper system according to claim 1 wherein
   the first pump comprises a gear pump with a leakage oil port connected to a return line.

7. The spring-damper system according to claim 6 wherein
   an outlet of a second pump is connected in fluid communication to an inlet of the gear pump.

8. The spring-damper system according to claim 1 wherein
   the first pump comprises a radial piston pump.

9. The spring-damper system according to claim 1 wherein
   the first pump comprises an orbital motor pump.

10. The spring-damper system according to claim 1 wherein
    the proportional throttle valves are 2/2-way proportional throttle valves.

11. A spring-damper system, comprising:
    a differential cylinder having an annular end and a piston end;
    a control valve device;
    a first pump operated by a motor and capable of supplying pressure fluid to the annular end or both the annular end and the piston end of the differential cylinder in a closed circuit using the control valve device, the first pump including a gear pump with a leakage oil port connected to a return line; and
    a hydraulic accumulator connected in fluid communication to the closed circuit.

12. The spring-damper system according to claim 11 wherein
    an outlet of a second pump is connected in fluid communication to an inlet of the gear pump.

* * * * *